(12) United States Patent
Nakamura et al.

(10) Patent No.: US 7,402,333 B2
(45) Date of Patent: Jul. 22, 2008

(54) TUBE-LIKE PLASTIC CONTAINER AND PREFORM THEREFOR

(75) Inventors: Yutaka Nakamura, Nagano-ken (JP); Takekazu Mochizuki, Nagano-ken (JP)

(73) Assignee: A.K. Technical Laboratory, Inc., Nagano-ken (JP)

( * ) Notice: Subject to any disclaimer, the term of this patent is extended or adjusted under 35 U.S.C. 154(b) by 560 days.

(21) Appl. No.: 10/490,823

(22) PCT Filed: Sep. 24, 2002

(86) PCT No.: PCT/JP02/09769
§ 371 (c)(1),
(2), (4) Date: Apr. 8, 2004

(87) PCT Pub. No.: WO03/029095
PCT Pub. Date: Apr. 10, 2003

(65) Prior Publication Data
US 2004/0188376 A1 Sep. 30, 2004

(30) Foreign Application Priority Data
Sep. 28, 2001 (JP) .............................. 2001-299973

(51) Int. Cl.
*B65D 35/08* (2006.01)
*B29C 49/00* (2006.01)

(52) U.S. Cl. ................. 428/36.92; 428/35.7; 428/542.8; 215/379

(58) Field of Classification Search ................. 215/379, 215/371, 900; 428/36.92, 542.8, 35.7; 222/95, 222/107
See application file for complete search history.

(56) References Cited

U.S. PATENT DOCUMENTS

| | | | | |
|---|---|---|---|---|
| 2,297,994 A * | 10/1942 | Vellinga | ...................... | 222/215 |
| 2,792,593 A * | 5/1957 | Hardgrove, Jr. | ............. | 425/525 |
| 3,632,713 A * | 1/1972 | Seefluth | ...................... | 264/520 |
| 4,254,079 A * | 3/1981 | Agrawal | ...................... | 264/537 |
| 5,101,990 A * | 4/1992 | Krishnakumar et al. | ..... | 215/383 |
| 5,158,817 A * | 10/1992 | Krishnakumar | .......... | 428/36.92 |
| 5,301,840 A * | 4/1994 | Sun | .............. | 222/109 |
| 5,364,585 A * | 11/1994 | Takeuchi | ................. | 264/520 |
| 5,660,902 A * | 8/1997 | Unterlander et al. | ....... | 428/35.7 |
| 5,660,905 A * | 8/1997 | Mero et al. | .............. | 428/36.92 |
| RE35,683 E * | 12/1997 | Varlet | .......................... | 53/420 |
| 5,816,451 A * | 10/1998 | Renault | ..................... | 222/215 |
| 2004/0262321 A1 * | 12/2004 | Takeda | ........................ | 220/675 |

FOREIGN PATENT DOCUMENTS

| | | |
|---|---|---|
| JP | 49-59966 A | 5/1974 |
| JP | 52-47861 A | 4/1977 |
| JP | 54-95666 A | 7/1979 |
| JP | 54-98438 A | 7/1979 |
| JP | 62-45240 A | 3/1987 |
| JP | 06-3343 A | 1/1994 |
| JP | 07-165245 A | 6/1995 |

* cited by examiner

*Primary Examiner*—Sue A Weaver
(74) *Attorney, Agent, or Firm*—Weingarten, Schurgin, Gagnebin & Lebovici LLP

(57) ABSTRACT

A tube-like plastic container and a preform therefor are provided. The preform has a drum part and a mouth part, with a continued portion having a projecting edge in between. The drum part is thicker than the mouth part, has a flat wedge-like form, and tapers toward a thinner bottom end. The drum part is thicker at a lower portion than at an upper portion.

1 Claim, 4 Drawing Sheets

TUBE-LIKE PLASTIC CONTAINER AND PREFORM THEREFOR

This application is a 371 national phase filing of PCT/JP02/09769 filed Sep. 24, 2002, and claims priority to a Japanese application No.2001-299973 filed Sep. 28, 2001.

TECHNICAL FIELD

The present invention relates to a tube-like container manufactured by stretch-blowing a preform molded from resin and the preform.

BACKGROUND ART

The conventional tube-like container has been manufactured by stretch blow molding by using a preform of which the drum part is cylindrical. After forming the drum part of the preform into a cylindrical drum part which has thin wall thickness and greater length than the finished product by stretch blow molding, a primary molded product opened at the lower end of the drum part is manufactured by cutting, and the opening at the lower end is closed by flattening and welding the wall of the lower end to make a flattened bottom end.

Consequently, cutting in the secondary working produces numerous chips which are liable to become waste of material. Moreover, even if the chips can be used as recycled material, the cost of recycling is high, so that the cost becomes comparatively higher than that of a packaging container in usual shape.

Furthermore, in the case of closing the lower end opening by welding after filling the container with the contents, the chips and the like may easily be mixed into the contents, so that it is difficult to use such a container as a packaging for foods and the like due to contamination.

DISCLOSURE OF INVENTION

The present invention is devised to solve the aforementioned conventional problems, and the purpose of the present invention is to provide a novel tube-like plastic container and a preform therefor that can be used as a stretch-blown container in an conventional shape as it is without requiring a additional working even in the tube-like container stretch blow molded.

The tube-like container of the present invention according to the aforementioned purpose comprises a circular mouth part and a bottomed drum part molded by stretch-blowing in thin wall thickness continuously connecting to the mouth part, wherein a continued portion between the drum part and the mouth part is formed in a shoulder part in a concentric circle in cross section, and a peripheral wall of the drum part is formed into a tapered flat wedge-like form shaped together with a bottom end.

The preform of the present invention comprises a circular mouth part and a bottomed drum part integrally formed with and connected continuously to the mouth part, wherein a continued portion between the drum part and the mouth part is formed into an projecting edge in a concentric circle in cross section and the drum part is formed into a flat wedge shape with an elliptic or oval shape in cross section, a peripheral wall of the drum part being formed thicker in thickness than the wall of the mouth part, a bottom end thereof being formed into a thinner flat bottom in wall thickness than the drum part, the drum part being tapered to the bottom end on a slant, moreover, the front and back walls of the lower drum part being formed thicker in wall thickness than the wall of an upper part of the drum part, and both sidewalls are formed on a gradual slant.

For the aforementioned resin, polypropylene, polyethyleneterephthalate, polycarbonate, polyethylene or other thermoplastic resins can be used.

BEST MODE FOR CARRYING OUT THE INVENTION

FIG. 1 shows a tube-like container 1 made of polyethyleneterephthalate comprising a circular mouth part 2 in a form of a short cylinder provided with thread on the outer periphery and a thin bottomed drum part 3 continued to the mouth part 2 molded by stretch-blowing together with a bottom part 4. The aforementioned mouth part 2 has an opening of a relatively large diameter for a tube container (for example, an inner diameter of 18 mm) and its size allows the container to be filled with the contents from the mouth part 2.

Further, the wall thickness of the drum part 3 is substantially equal to that of a film or a sheet, a continued portion between the drum part 3 and the mouth part 2 being formed into a shoulder part 5 in a concentric circle in cross section, the peripheral wall of the drum part being formed into a tapered flat wedge-like form shaped together with the bottom end 4, thereby allowing the contents filled inside from the mouth part 2 to be easily squeezed out by pressing.

In such a tube-like container 1, since the drum part 3 and the bottom end 4 are already formed integrally, a secondary working as in the prior art for closing an opening made by cutting the lower end of a thin wall of the cylindrical drum part by flattening and welding the lower portion of the drum part becomes unnecessary, and no chips are produced. Thus, waste of material is eliminated, so that no chips can be mixed into the content inside the container, thereby the tube-like container 1 can be used for the container as a food-packaging container.

FIG. 2 and FIG. 3 show a preform 11 for the aforementioned tube-like container 1, in which the preform 11 comprises a circular mouth part 12 in a form of a short cylinder, which becomes the mouth part 2 of the tube-like container 1 and a bottomed drum part 13 formed integrally together with a bottom end 4 and connected continuously to the mouth part 12. A continued portion between the drum part 13 and the mouth part 12 is formed into a projecting edge 15 in a concentric circle in cross section. The drum part 13 is tapered from the projecting edge 15 to the bottomed part 14 at a gradient of approximately 3.3 degrees, and at the same time both side walls 13a, 13b of the drum part 13 are formed inward at a gradient of 0.5 degrees on a slant, thereby the drum part appears to be in a flat wedge-like form, of which the cross section is in an elliptic or oval shape. The peripheral wall of the drum part 13 is formed thicker in thickness than the wall of the mouth part 12, and the bottom end 14 is flatly formed thinner in wall thickness than the drum part 13. The lower potion of the drum part 13 of front and back walls 13c and 13d is formed gradually thicker in wall thickness toward the bottom end 14 than the upper portion of the drum part by 15 to 20% at maximum and most preferably around 18%.

The abovementioned preform 11 can be easily molded by a conventional injection molding method. The obtained preform 11 can be stretch blow molded into the tube-like container 1 immediately or after controlling the temperature after the injection molding, or after reheating the perform, as shown in FIGS. 4 and 5, by holding the mouth part 12 with a neck mold 16, inserting the preform 11 into a blow mold 21 having a cavity 20 for the aforementioned tube-like container 1 with aligning the front and back faces of both the blow mold and the preform, and stretching and inflating the preform 11 fully into the cavity by air blow, blown out from a blow core 22 in the mouth part inserted from above during the closing of the mold and by axial stretching (approximately 2.5 times as long) by a stretch rod 23 in the drum part inserted with the blow core 22.

Besides, by using the preform 11 in which front and back walls 13c and 13d of the drum part 13 are tapered like flat wedge shape, a room for expansion exists between the cavity face and the preform 11 especially around the bottom where the width of cavity 20 is gradually narrowed. Moreover, the lower portion having greater wall thickness can be smoothly stretched due to having much heat quantity kept in the thick wall of the drum, and thus it allows the lower portion to be stretched without solidification even if it contacts with the cavity face longer in the lower portion. Thereby uneven thickness in the lower portion of the tube-like container 1 is prevented.

Consequently, in the aforementioned tube-like container 1 molded by stretch-blowing the preform 11, uniformed wall thickness distributions of the drum part 13 can be achieved, and post-working is unnecessary because the drum part 13 and the bottom end 14 are molded simultaneously, and cost can be saved as it can be used for filling with the contents for packaging as it is.

INDUSTRIAL APPLICABILITY

Figure 1:
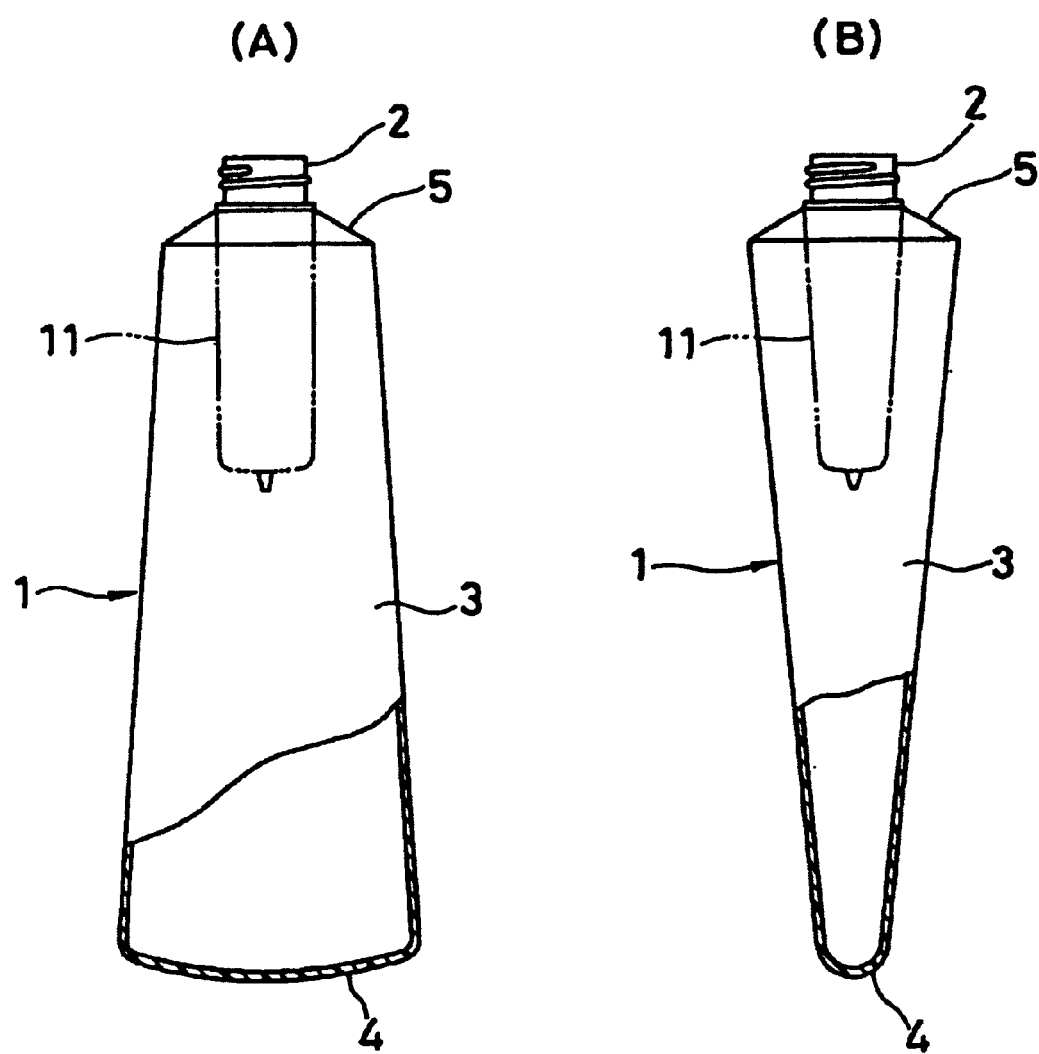
FIG. 1 is an illustrative drawing showing a longitudinal front sectional view (A) and a longitudinal side sectional view (B) of a resin tube-like container according to the present invention.
Figure 2:
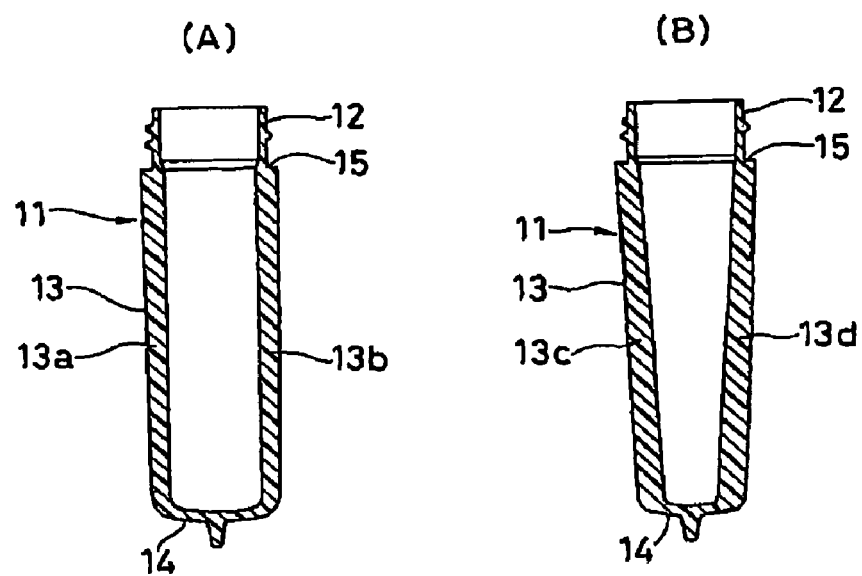
FIG. 2 is an illustrative drawing showing a longitudinal front section al view (A) and a longitudinal side section al view (B) of a preform according to the present invention.
Figure 3:
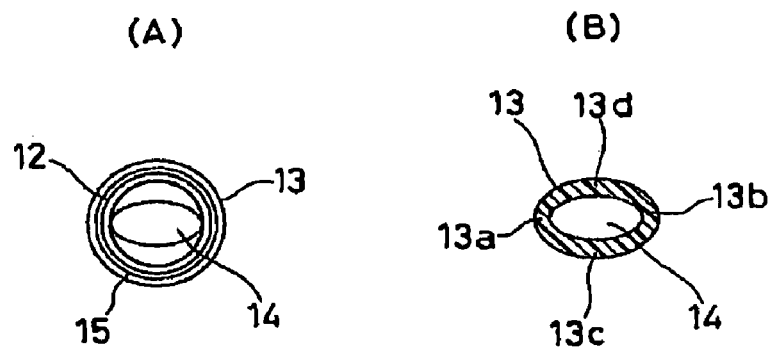
FIG. 3 is also an illustrative drawing showing a top view (A) and a drum part cross sectional view (B) of the preform.
Figure 4:
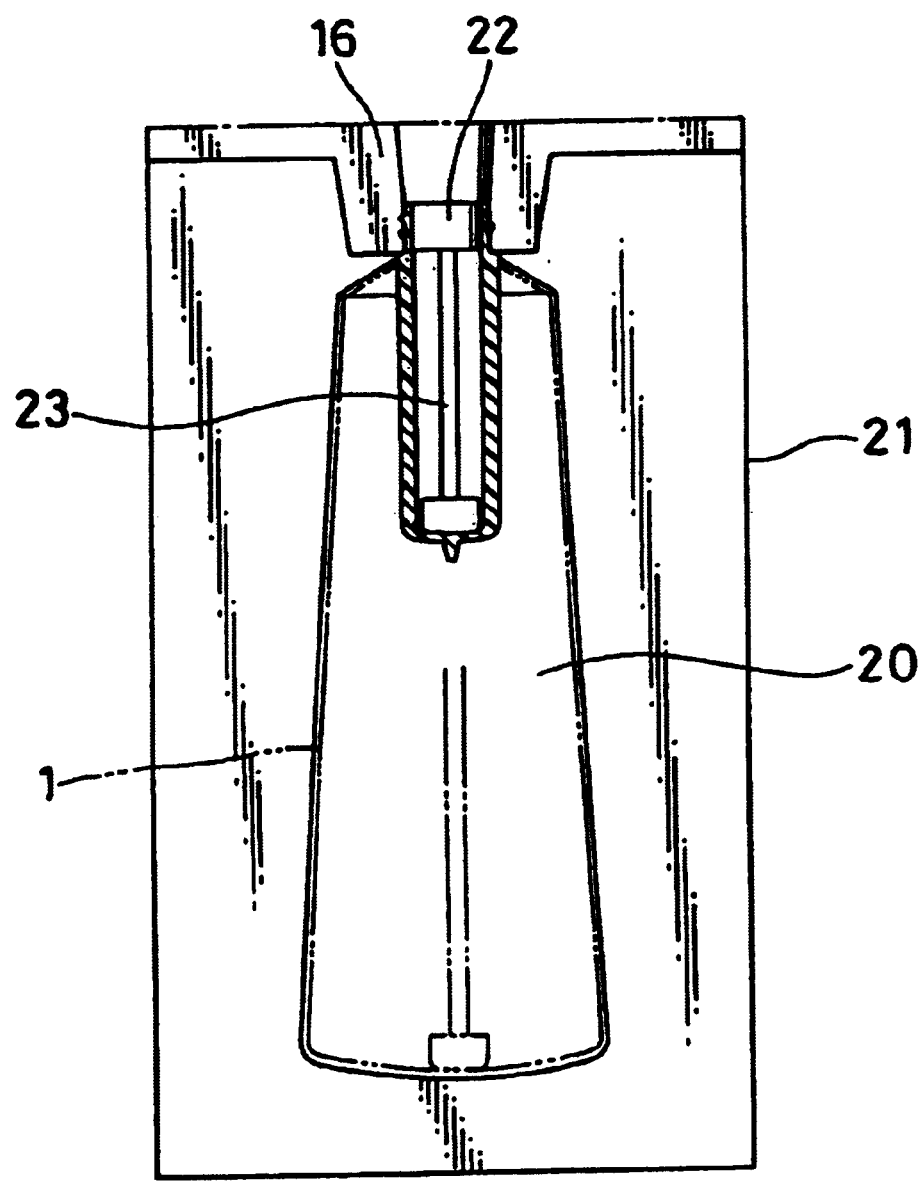
FIG. 4 is a front view of a half of the blow mold in a state in which the preform is inserted.
Figure 5:
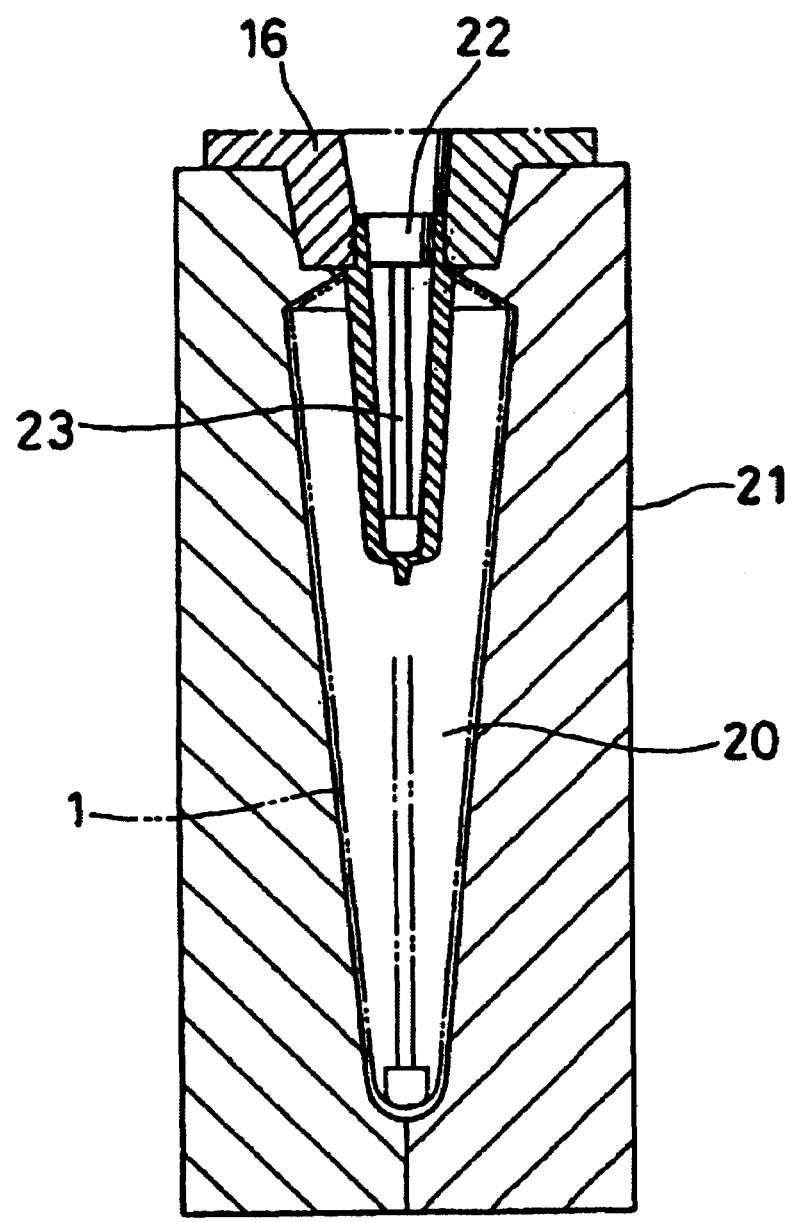
FIG. 5 is also a longitudinal side sectional view of the blow mold.

The present invention is advantageous because even the resin tube-like container molded by stretch-blowing can be used as the bottomed container without requiring a secondary working as in the case of a packaging container of usual configuration.

The invention claimed is:

1. A preform for a tube-like plastic container, comprising:
a circular mouth part;
a bottomed drum part integrally formed with and continuously connected to said mouth part; and
a continued portion between said drum part and said mouth part;
wherein:
said continued portion is formed into a projecting edge in a concentric circle in cross section,
said drum part is formed into a flat wedge-like form in an elliptic or oval shape in cross section,
a peripheral wall of said drum part is formed thicker in thickness than the wall of said mouth part,
a bottom end of the bottomed drum is formed into a thinner flat bottom in wall thickness than the drum part,
the drum part is tapered toward the bottom end on a slant,
in the front and back walls of said drum part, the wall of the lower portion of the drum part is formed thicker in wall thickness than the wall of the upper portion of the drum part, and
both sidewalls are formed on a gradual slant.

* * * * *